(12) United States Patent (10) Patent No.: US 9,154,533 B2
Morrison, III et al. (45) Date of Patent: Oct. 6, 2015

(54) INTELLIGENT PREFETCHING OF RECOMMENDED-MEDIA CONTENT

(71) Applicant: Microsoft Corporation, Redmond, WA (US)

(72) Inventors: Frank R. Morrison, III, Kirkland, WA (US); Mark J. McNulty, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/723,560

(22) Filed: Dec. 21, 2012

(65) Prior Publication Data

US 2014/0179441 A1 Jun. 26, 2014

(51) Int. Cl.
*G06F 17/00* (2006.01)
*H04L 29/06* (2006.01)
*A63F 9/24* (2006.01)
*H04N 21/25* (2011.01)
*H04N 21/442* (2011.01)
(Continued)

(52) U.S. Cl.
CPC . *H04L 65/60* (2013.01); *A63F 9/24* (2013.01); *H04N 21/251* (2013.01); *H04N 21/4424* (2013.01); *H04N 21/44209* (2013.01); *H04N 21/44222* (2013.01); *H04N 21/458* (2013.01); *H04N 21/4781* (2013.01); *H04N 21/4788* (2013.01); *H04N 21/8549* (2013.01)

(58) Field of Classification Search
USPC .................. 463/31, 32, 43; 705/14.53, 14.54
See application file for complete search history.

(56) References Cited

U.S. PATENT DOCUMENTS 7,774,294 B2 8/2010 Aravamudan et al.
7,797,343 B2 9/2010 Morain et al.
(Continued)

FOREIGN PATENT DOCUMENTS

WO WO 2011026887 3/2011

OTHER PUBLICATIONS

Zeb, et al., "Interest Aware Recommendations Based on Adaptive User Profiling", In Proceedings of IEEE/WIC/ACM International Conference on Web Intelligence and Intelligent Agent Technology, Aug. 22, 2011, 4 pages.
(Continued)

*Primary Examiner* — Ronald Laneau
(74) *Attorney, Agent, or Firm* — Bryan Webster; Kate Drakos; Micky Minhas (57) ABSTRACT

In various embodiments, methods and systems for prefetching recommended-media content based on a prefetch setting of a media platform are provided. A recommended-media record of recommended-media content is received. The recommended-media record is generated based on recommendation metrics of a recommendation profile. The recommended-media record is associated with a media platform. The media platform determines based on a prefetch setting for the media platform how to automatically download the recommended-media content associated with the recommended-media record to the media platform, where a default prefetch setting results in automatically downloading the recommended-media content to the media platform and a customized prefetch setting results in automatically downloading the recommended-media content based on the customized prefetch setting. Upon determining how to download the recommended-media content, the recommended-media content is downloaded based on the prefetch setting of the media platform.

20 Claims, 5 Drawing Sheets

(51) Int. Cl.
*H04N 21/458* (2011.01)
*H04N 21/478* (2011.01)
*H04N 21/4788* (2011.01)
*H04N 21/8549* (2011.01)

(56) References Cited

U.S. PATENT DOCUMENTS

| | | |
|---|---|---|
| 2002/0175998 A1 | 11/2002 | Hoang |
| 2003/0164844 A1* | 9/2003 | Kravitz et al. ............ 345/700 |
| 2005/0120391 A1* | 6/2005 | Haynie et al. ............ 725/135 |
| 2006/0069617 A1 | 3/2006 | Milener et al. |
| 2007/0130585 A1 | 6/2007 | Perret et al. |
| 2007/0277202 A1 | 11/2007 | Lin et al. |
| 2009/0025054 A1 | 1/2009 | Gibbs et al. |
| 2009/0077195 A1* | 3/2009 | Gibbs et al. .............. 709/217 |
| 2009/0240771 A1 | 9/2009 | Capobianco |
| 2010/0005084 A1 | 1/2010 | Nguyen et al. |
| 2011/0302032 A1 | 12/2011 | Ishii et al. |

OTHER PUBLICATIONS

International Search Report and Written Opinion in PCT/US2013/076925, mailed Apr. 24, 2014, 11 pages.

* cited by examiner

INTELLIGENT PREFETCHING OF RECOMMENDED-MEDIA CONTENT

BACKGROUND

Users utilize various types of digital media content such as movies and video games. A recommender system predicts a preference that a user would have for digital media content, which the user might not have considered and makes recommendations. The user then accesses and utilizes the recommended digital media content. However, digital media content may not be immediately accessible because of the time it takes to download the digital media content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method and system for prefetching recommended-media content based on a prefetch setting of a media platform. A recommended-media record of recommended-media content is received. The recommended-media record is generated based on recommendation metrics of a recommendation profile. The recommended-media record is associated with a media platform. The recommended-media record may also be indirectly associated with a media platform via a user. The media platform determines, based on a prefetch setting for the media platform, how to automatically download the recommended-media content associated with the recommended-media record to the media platform. A default prefetch setting results in automatically downloading the recommended-media content to the media platform and a customized prefetch setting results in automatically downloading the recommended-media content based on the customized prefetch setting. Upon determining the manner in which to download the recommended-media content, the recommended-media content is downloaded based on the prefetch setting of the media platform.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

Various aspects of the technology described herein are generally directed to systems, methods, and computer storage media for, among other things, intelligently prefetching recommended-media content based on a prefetch setting associated with a media platform. Digital media content ("media content") may generally refer to information delivered to an end-user in specific contexts (e.g., listening to music, watching movies, playing video games). Media content may include, but is not limited to, audio files, video files, image files, and video games. Media content may also include computer programming code, JavaScript, HTML, etc. for example, software. Media content includes the various formats and genres of information associated with a particular type of media content. In particular, digital media content may include game content that refers generally to games that employ electronics to create an interactive system with which a player can play. Games may include human interaction with a user interface to general visual feedback on a video device. Game content may include game demos associated with full version games. Game content may further include downloadable content (e.g. DLC) that is additional content for a video game, for example, new game modes, objects, levels, challenges or other features to complete an already released game. Game content may also include modifications, cheat codes, patches, and other types of multimedia content that is associated with a video game.

Media content is delivered via a media platform (e.g., computing device, game console, or tablet) comprising an associated display. A media platform may support several different types of media content. The media platform may also include support applications (e.g., software applications) for using the media content. Media content is downloaded onto media storage (e.g., local hard drive or network locations) associated with media platform. The media platform may include several different control features (e.g., remotes or controllers) and interface features (e.g., display interface, gesture interface) that allow users to use the media content. By way of illustration, a video game is a customized computer system that connects to a display device (e.g., television). A controller may be used to interact via an interface to use the media content. A user may play a variety of video games on a console and also watch television, listen to music, and surf the web using several different support applications.

Media content on a media platform may be made available via a recommendation system. Recommendations systems help predict user interest in media content. A recommendation system evaluates user interests and performs calculations using user-interest data to identify recommended-media content. For example, when users watch movies, they may provide feedback on their level of satisfaction with each movie. User satisfaction information for movies may be collected and the data used to make recommendations to other users. Upon identifying the recommended-media content, the user then has to access the media-content. Downloading the media content to the media platform may take some time, and depending on the size of the particular download it may take up to several hours for a download to complete. Recommended-media content may be accessed without delay when intelligently prefetched on the media platform without user intervention.

In accordance with embodiments hereof, a recommendation profile is received. The recommendation profile may be received at a prefetch manager that manages the intelligent prefetching system. The prefetch manager may be located on the media platform and it is also contemplated that the prefetch manager may be implemented on any device in a distributed networking environment in accordance with embodiments of the present invention. The recommendation profile received at the prefetch manager may be associated directly with a media platform or indirectly, via a user. The recommendation profile includes recommendation metrics (e.g., usage statistics, user ratings) used to identify recommended-media content. Recommendation metrics may include pre-processed signals and real-time signals from the user. The recommendation profile is sent to a recommendation engine. The recommendation profile is used to determine recommended-media content.

A recommended-media record for the recommended-media content is generated at the recommendation engine. The recommendation-media record is also associated with the media platform of the recommendation profile. The recommended-media record is received at the prefetch manager from the recommendation-media engine. The prefetch manager then determines based on a prefetch setting for the media platform, how to automatically download to the media platform the recommended-media content associated with the recommended-media record. A default prefetch setting results in automatically downloading the recommended-media content to the media platform and a customized prefetch setting results in automatically downloading the recommended-media content based on the customized prefetch setting.

In a first aspect of the present invention, one or more computer storage media storing computer-useable instructions that, when used by one or more computing devices, cause the one or more computing devices to perform a method for prefetching recommended-game content based on a prefetch setting. The method includes receiving a recommended-game record reciting a recommended-game content. The recommended-game record is associated with the media platform. The method further includes determining, based on the prefetch setting for the media platform, how to automatically download the recommended-game content to the media platform. The method also includes downloading the recommended-game content based on the prefetch setting.

In a second aspect of the present invention, one or more computer storage media storing computer-useable instructions that, when used by one or more computing devices, cause the one or more computing devices to perform a method for prefetching recommended-media content based on a prefetch setting. The method includes receiving a recommendation profile comprising recommendation metrics for identifying recommended-media content. The method also includes generating a recommended-media record of recommended-media content based on the recommendation profile. The recommended-media content is downloaded to a media platform based on determining a prefetch setting of the media platform. Determining that the prefetch setting is a default setting results in automatically downloading the recommended-media content to the media platform and determining that the prefetch setting is a customized setting results in automatically downloading the recommended-media content based on the customized prefetch setting. The method further includes sending the recommended-media record to the media platform.

In a third aspect of the present invention, perform a method for prefetching recommended-media content based on a prefetch setting is provided. The method includes sending recommendation metrics to a recommendation-metrics server. Receiving a recommendation profile generated based on recommendation metrics. The recommendation profile is associated with a media platform. The method also includes sending the recommendation profile to the recommendation engine. The method further includes receiving a recommended-media record of recommended-content generated based on the recommendation profile. The recommendation-media record is associated with the media platform. The method further includes determining based on a prefetch setting for the media platform how to automatically download to the media platform recommended-media content associated with the recommended-media record. A default prefetch setting results in without user intervention automatically downloading the recommended-media content to the media platform and a customized prefetch setting results in without user intervention automatically downloading the recommended-media content based on the customized prefetch setting. The method also includes downloading the recommended-media content based on the prefetch setting.

Figure 1:
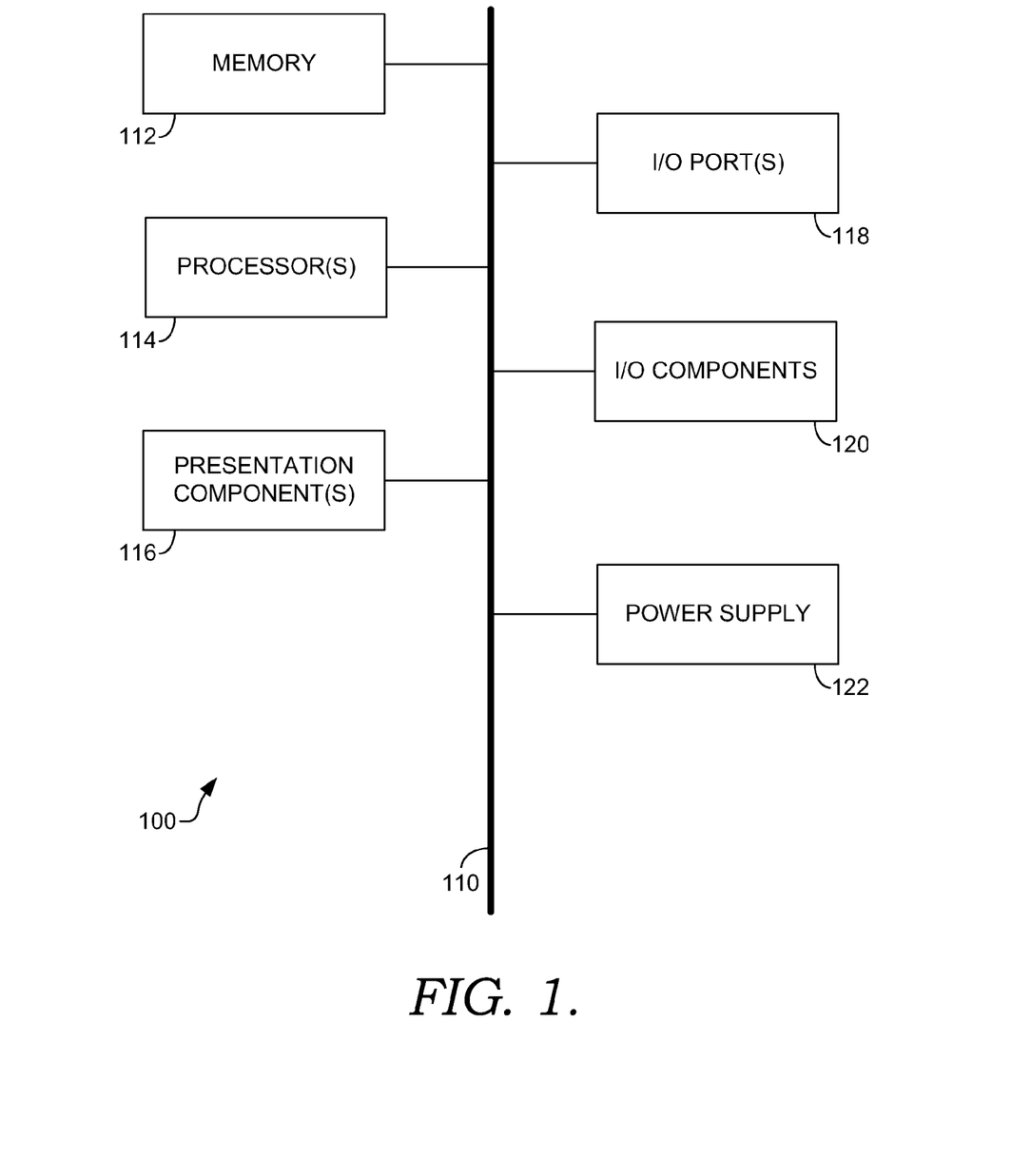
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
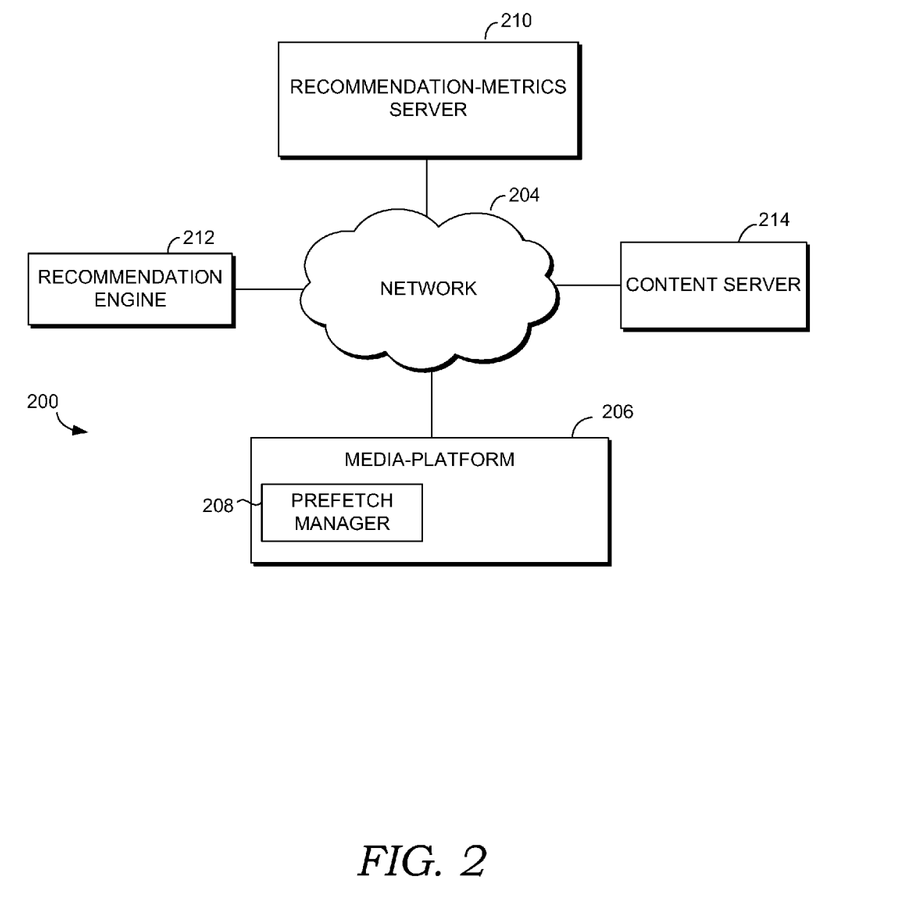
FIG. 2 is a block diagram of an exemplary network environment in which embodiments of the invention may be employed.

With additional reference to FIG. 2, a block diagram depicting an exemplary network environment 200 suitable for use in embodiments of the invention described. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The network environment 200 includes a network 204, a media platform 206, a prefetch manager 208, a recommendation-metrics server 210, a recommendation engine 212, and a content server 214. Each of the components shown in FIG. 2 may be any type of computing device, such as computing device 100 described with reference to FIG. 1, for example. The components may communicate with each other via a network 204, which may include, without limitation, one or more local area networks (LANs) and/or wide area networks (WANs). Such networking environments are commonplace in offices, enterprise-wide computer networks, intranets, and the Internet. It should be understood that any number of media platforms, recommendation-metrics servers, recommendation engines, and prefetch managers may be employed within the network environment 200 within the scope of the present invention. Each may comprise a single device or multiple devices cooperating in a distributed environment. Additionally, other components not shown may also be included within the network environment.

The recommendation-metrics server 210 operates to generate a recommendation profile through aggregation and analysis of recommendation metrics. The recommendation profile is a collection of recommendation information associated with a specific media platform (e.g., media platform 206) or user. A user is discrete from other users and may be associated with a user account including a username and password. Such a user may be associated with a single media platform or a plurality of media platforms where the recommended-media content may be downloaded onto. In embodiments, media-content may be selectively downloaded onto different media platforms based on the prefetch settings for the media platform. A media platform may also be its own user with a user account for which a media content consumption pattern is modeled. The media-content consumption pattern is for the media platform itself and indirectly associated with the users of the media platform. In this regard, a user as defined herein may include a discrete user or a media platform.

The recommendation profile of a user or media platform refers to an explicit representation of information used to identify recommended-media content to be downloaded to a media platform. The recommendation profile can aggregate, analyze, and store user information used in identifying recommended-media content. Such user information may be referred to herein as recommendation metrics i.e., a measure of usage activity that informs recommended-media content. The recommendation metrics are received from the media platform or user and used to generate the recommendation profile. For example, the recommendation profile may include a model from a user's past behavior (e.g., purchase history of items previously purchased or selected and/or numerical ratings given to those items) as well as similar decisions made by other users. A recommendation profile may also utilize a series of discrete characteristics of an item of the user in order to recommend additional items with similar properties. Recommendation metrics may be collected using explicit data collection methods (e.g., asking a user to rate an item on a sliding scale) or implicit data collection methods (e.g., observing items a user views or uses). Any and all such variations, and any combination thereof, are contemplated to be within the scope of embodiments of the present invention.

With continued reference to FIG. 2, the recommendation-metrics server 210 may also analyze aggregated information to generate a recommendation profile used to identify recommended-media content. Recommendation metrics may include raw signal information, including but not limited to usage, purchase, rating, search queries, click-through, etc. By way of illustration, a signal may be a feedback signal that measures a level of interest. A signal may be associated with a particular user or media. A signal may be any type of information received from a user that is associated with a type of media. In an embodiment, a user may submit a Like or Not Like feedback for a purchase or usage of a product. In another embodiment, the signal could be a multiple rating system (e.g., a 1-5 star rating). The signal may describe how a user feels about particular media content. In such embodiments, the signal may describe how pleased or dissatisfied the user is with the media content. Raw signals may also include social scope (e.g., friends and user groups) that help derive social scope data that influence recommended-media content. Any and all such variations, and any combination thereof, are contemplated to be within the scope of embodiments of the present invention.

The raw signals are received from the media platform and processed into the recommendation profiles. Processing a raw signal may include storing and organizing the signal data such that it may be used efficiently. At a basic level, the recommendation metrics sever receives the user feedback information as raw signal information and converts the raw signal information into a processed signal (e.g., normalization) that may used to generate a recommendation profile. It is contemplated that different types of processed signals may be utilized for the present invention. The recommendation profile is further enhanced by including social context (e.g., friends, social networks, and communities) to generate social based recommendations. For example, the recommendation profile may be associated with additional recommendation profiles of a user within a community of social network. In this regard, the social networking content of the user associated with the recommended-profile and other associated users may be analyzed to enhance the recommendation profile.

The recommendation profile may also account for time and understanding time-based behavior by looking at the recent user's activities. The recommendation profile also accounts for previously recommended-media content and a consumption pattern of the media-content by looking at how quickly the recommended-media is used, how frequently media-content is accessed, whether demo content later translated into a purchase, etc. A game content consumption event occurrence (e.g., playing a video game, completing a level, purchasing a game) may in particular also factor into a recommendation profile. Any and all such variations, and any combination thereof, are contemplated to be within the scope of embodiments of the present invention. Such information in the recommendation profile may be part of a recommendation feedback loop. The feedback loop takes new raw signals associated with recommended-media content as recommendation metrics and information and updates the recommendation profile. In this regard, the recommendation profile remains up-to-date to inform recommended-media content.

As discussed, the recommendation-metrics server 210 receives recommendation metrics from a media platform 206 and generates a recommendation profile. In embodiments, the recommendation-metrics server 210 sends the recommendation profile to a prefetch manager 208 associated with a media platform 206 to be forwarded to a recommendation engine. It is contemplated that the recommendation profile may be communicated and directed to the recommendation engine using several different methods beyond the exemplary methods described herein. For example, the recommendation profile may also be communicated directly to the recommendation engine. The transfer of information between the components described herein may be at a determined periodic interval or upon the happening of an event associated with recommended-metrics presented herein, such that the recommended-media content is up-to-date. For example, an identified consumption pattern like a user at 90% completion of a demo game could automatically trigger the transfer of information between components that leads to prefetching recommended-media content. Any and all such variations, and any combination thereof, are contemplated to be within the scope of embodiments of the present invention.

The recommendation engine 212 operates to identify recommended-media content based on a recommendation profile comprising recommendation metrics. The recommendation engine 212 may receive the recommendation profile from the media platform. In embodiments the recommendation profile may be received directly from the recommendation-metrics server. The recommendation engine 212, using the recommendation profile, evaluates user interests and performs calculations using user-interest data to identify recommended-media content. For example, when users watch movies, they may provide feedback on their level of satisfaction with each movie. User satisfaction information for movies may be collected and the data used to make recommendations to other users. In one embodiment, recommendations are generated via matrix factorization that provides a way for recommendation systems to recommend media content. For example, collaborative filtering or content-based filtering in matrix factorization creates a user-item matrix for recommending different types of media (e.g., movies, music, video games, television shows). Hybrid approaches can be implemented in several ways: by making content-based and collaborative-based predictions separately and then combining them. Any and all such variations of recommender systems, and any combination thereof, are contemplated to be within the scope of embodiments of the present invention.

In operation, the recommendation engine 212 identifies recommended-media content based on the recommendation profile and generates a recommended-media record. The recommended-media record refers to a preservation of identified recommended-media content such that it is communicated to the media platform to be downloaded. The recommendation engine finds recommended-media content and it is recorded for future content acquisition. The recommended-media record is associated with the media platform 206 of the recommendation profile. Recommended-media content may include targeted media. For example, people who use social networks store various information associated with different social networks including but not limited to age, gender, interests, and location. The stored information may be used to identify recommended-media content targeted at that particular user group or social network. Advertising media (e.g., video game demo and or movie trailers) for a particular user or device may also be included such that mostly advertisements that actually interest the user are presented. Further, recommended-media may also include matchmaking media. Media may be identified based on matchmaking technique where similar users or similar devices are matched together. For example, a gamer may be matched with another gamer for the purpose of identifying media content from both users and generating recommendations based on each other. Any and all such variations, and any combination thereof, are contemplated to be within the scope of embodiments of the present invention. The recommendation engine 212 sends the recommended-media content to a prefetch manager 208 associated with a media platform and all such recommended-media content may be proactively prefetched and stored on the media platform in advance of any user interaction.

The media platform 206 may include any type of computing device, such as the computing device 100 described with reference to FIG. 1, for example. Media content is delivered via the media platform 206 (e.g., computing device, game console, or tablet) with an associated display. The media platform 206 may support several different types of media content. The media platform may also include support applications for using the media content. Media content is downloaded onto the media storage (e.g., local hard drive or network locations) associated with media platform. The media platform 206 includes several different control features (e.g., remotes or controllers) and interface features (e.g., display interface or gesture interface) that allow users to use the media content.

Generally, the media platform 206 is associated with a prefetch manager 208. The prefetch manager 208 operates to direct information between components in the present invention. The prefetch manager 208 may be associated with a single media platform. The prefetch manager 208 may also be associated with a plurality of media platforms via a single user. In embodiments, the prefetch manager 208 is configured to receive a recommendation profile from the recommendation-metrics server 210 and forward the recommendation profile to a recommendation engine 212. The recommendation profile may be updated with up-to-date information (e.g., real-time recommendation metrics) on the media platform prior to forwarding the recommendation profile to the recommendation engine 212. It is contemplated that the recommendation profile may include processes signals that may be appended with additional information in real-time from media platform via the prefetch manager.

The prefetch manager 208 also operates to provide signaling, notifying, sending, streaming, and otherwise communicating the intent or request to prefetch media content to a media platform based on a recommendation-media record. In this regard, the prefetch manager 208 controls the download of recommended-media content based on prefetch settings associated with a media platform. Upon receiving a recommended-media record, the prefetch manager 208 determines how to download the recommended-media record. A default prefetch setting results in automatically downloading the recommendation-media record. A customized prefetch setting results in automatically downloading the recommended-media content based on the customized prefetch setting. Upon receipt of a recommended-media record, downloading the recommended-media content may be done without user intervention. With the prefetch manager 208 set to a default prefetch setting, the recommended-media content is prefetch or automatically downloaded based on a plurality of default parameters when a recommended-media record is received at the media platform. The customized prefetch setting include customized parameters that have been configured to automatically download the recommended-media content differently from the default parameters. Default parameters may be factory configurations by a system administrator while customized parameters may either be factory configured pre-sets or other user-defined parameters.

Parameters include restrictions and limitations configured for the media platform in automatically download recommended-media content. Parameters may include, but not limited to, scheduling (time of day, type of media-content, prioritization), bandwidth (e.g., bandwidth caps, idle times, bandwidth consumption, bandwidth throttling), capacity (storage remaining, size of files, device state). Scheduling parameters generally refer to sequencing and allocation of time for automatically media-content. Bandwidth parameters manage the traffic of packets of recommended-media content on the network. Capacity parameters refer to the ability of the media platform to receive or contain recommended-media content. Any and all such variations of parameters, and any combination thereof, are contemplated to be within the scope of embodiments of the present invention. The parameters are associated with both default prefetch settings and customized prefetch settings and used by the prefetch manager 208 when communicating the intent or request to prefetch media content.

The prefetch manager 208 also controls the download of media-content. The prefetch manager 208 may include an interface for interacting with any of the features described herein that are associated with prefetch manager. As discussed, the prefetch manager 208 may be a component on the media platform; however the prefetch manager may also be an external component providing the same service. The prefetch manager 208 may be used to: pause the download of the recommended-media content, resume the download of recommended-media content, or delete the download of recommended-media content. The prefetch manager 208 may also proactively remove recommended-media content from a device or schedule a removal of such content, or with user intervention perform similar actions. In particular, the prefetch manager may provide for prioritization or de-prioritization of recommended-media content. Prioritization and de-prioritization may be triggered by default prefetch settings or customized prefetch settings. Prioritization and de-prioritization may further be associated with updated recommendation-metrics, new recommended-media content, and external actions of a user or on the media platform. Any and all such variations, and any combination thereof, are contemplated to be within the scope of embodiments of the present invention. For example, recommended-media content may be de-prioritized over selected user content, especially if the selected user content (e.g., a full version of a game) is associated with the recommended content (e.g., a demo of the game that has since been purchased). It would be an intelligent function of prefetching for the prefetch manager to recognize this conflict and other similar conflicts and perform a prioritization or de-prioritization action. With regard to this example in particular, the prefetch manager may not only de-prioritize but terminate the recommended content. In general, predefined actions by the prefetch manager may be triggered by associated consumption patterns of a media platform or user. For example, a recommended-content that might not have been accessed may be automatically deleted based on an identified consumption pattern of the media platform or user.

The prefetch manager 208 may also determine the content acquisition methodology (e.g., content delivery networks or peer-to-peer networks). Access to recommended-media content on the recommended-media record may be configured in the prefetch setting such that different media content may be downloaded using different methods. Content acquisition may be associated with one or more content providers having a content server 214 with stored media content. Media content may include, but is not limited to, audio files, video file, image files, and video games. Media content may also include computer programming code, JavaScript, HTML, etc. for example, software. Media content includes the various formats and genres of information associated with a particular type of media content. Acquisition of media content may be by different content acquisition methods (e.g., content delivery networks or peer-to-peer networks) associated with different types of media content. The content server 214 transfers media content with a content acquisition method based on a prefetch setting associated with a media platform. In operation, the content server 214 receives a request from the prefetch manager for identified recommended-media content and the content server 214 provides the content for download onto the media platform associated with the recommended-media content. Content server 214 may also provide prefetching for streaming media when identified in the recommended-media record.

Figure 3:
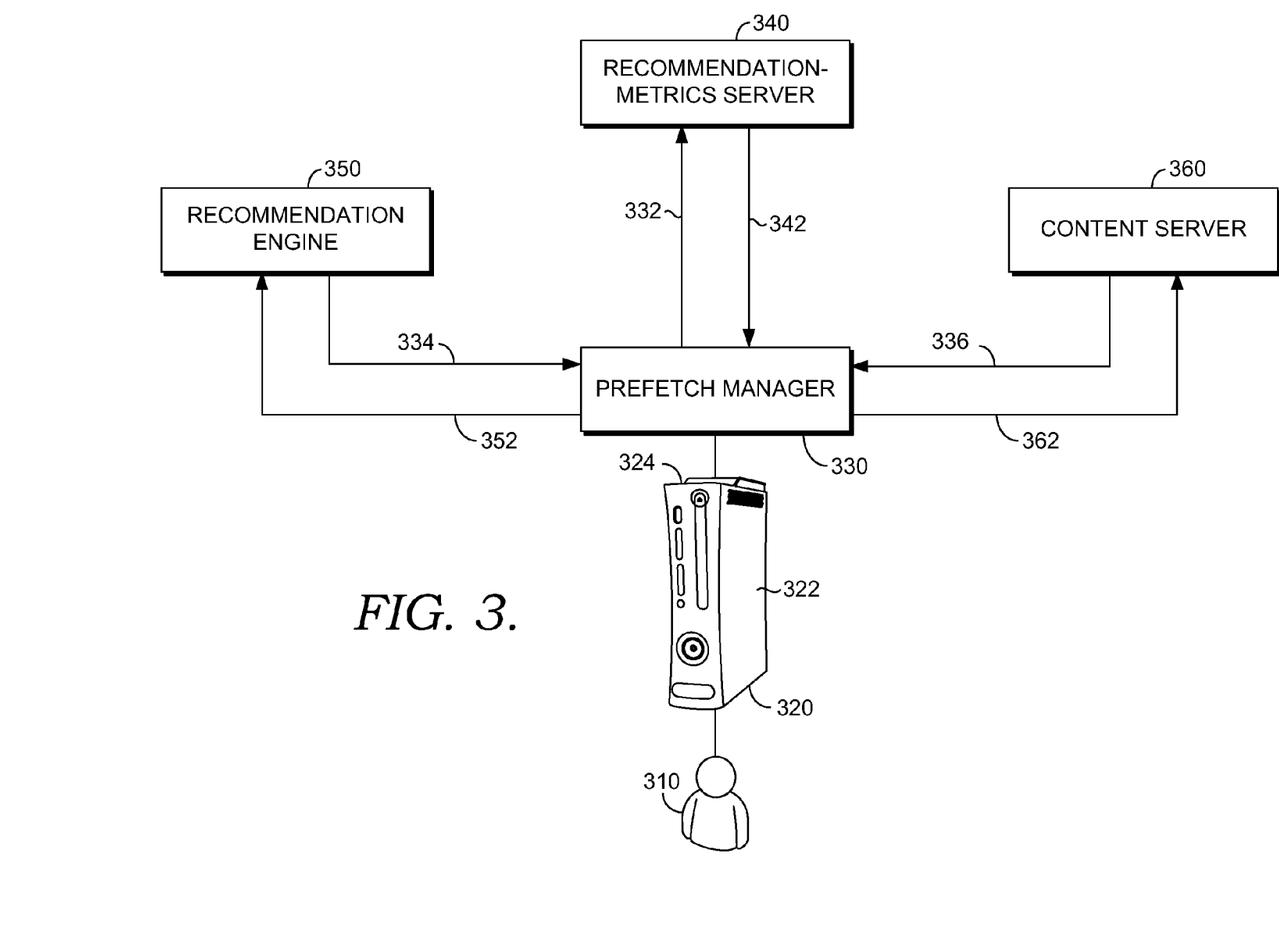
FIG. 3 is a schematic diagram showing a method for prefetching recommended-media content based on a prefetch setting of a media platform in accordance with embodiments of the present invention.

With reference to FIG. 3, a schematic diagram is illustrated showing an exemplary method for prefetching recommended-media content based on a prefetch setting of a media platform. As illustrated the schematic diagram includes a user 310 (e.g. "LIONEL MESSI"), a media platform 320 (e.g. XBOX® provide by Microsoft Corporation of Redmond, Va.), a prefetch manager 330, a recommendation-metrics server, 340, a recommendation engine 350, and a content server 360. The prefetch manager 330 communicates 332 recommendation metrics 322 to the recommendation-metrics server. The prefetch manager 330 may be an internal or external component associated with the media platform 320. The recommendation metrics 322 are associated with a media platform 320 via a user 310. The recommendation metrics 322 include raw signals (e.g., usage statistics, content, ratings) that are analyzed at the recommendation-metrics server 340 to generate a recommendation profile. For example, "LIONEL MESSI" may have 10% completion for "FIFA 13 Demo" game provided by Electronic Arts of Redwood City, Calif. in the recommendation metrics 322 that are used to generate the recommendation profile.

The recommendation profile is communicated 342 from the recommendation-metrics server to the prefetch manager. The recommendation profile may be transferred from the recommendation-metrics server 340 at a determined periodic interval or upon the happening of a media consumption event such that the recommended-media content is up-to-date. In embodiments, the recommendation profile is updated with real-time recommendation metrics 324 from the media platform. For example, "LIONEL MESSI" may now have 90% completion for the "FIFA 13 Demo" and as such updated in the recommendation profile. As shown, the recommendation profile is communicated 352 to a recommendation engine 350 where the recommendation profile is used to identify recommended media content. A number of different recommender system methods (e.g., collaborative filtering, content-based filtering or a hybrid system) may be employed to identify the recommended-media content. The recommended-media content is recorded in a recommended-media record. For example, for "LIONEL MESSI" a recommended-media record might include "FIFA 13 Full Version" game provided by Electronic Arts of Redwood City, Calif. and "Bend it Like Beckham" movie provided by Fox Searchlight Pictures of Los Angeles, Calif. The recommended-media record is communicated 352 from the recommendation engine 350 and received at the prefetch manager. The prefetch manager 330 includes a prefetch setting for the media platform. The prefetch manger determines how to automatically download to the media platform recommended-media content associated with the recommended-media record. A default prefetch setting results in automatically without user intervention downloading the recommended-media content to the media platform and a customized prefetch setting results in automatically downloading without user intervention the recommended-media content based on the customized prefetch setting. Upon determining how to automatically download to the media platform recommended-media content, the recommended-media content is downloaded the recommended-media content based on the prefetch setting. In operation, the prefetch manager 330 communicates 336 a request to a content server 360 for identified recommended-media content in the recommended-media record. The recommended-media content may is communicated 336 from the content server 360 to the media platform. A variety of different methods of content acquisition (e.g., content delivery network, peer-to-peer network) may be used in download the media content onto the media platform. With continued reference to the above example, the recommended media record for "LIONEL MESSI" is used to automatically download the recommended-media content without user intervention onto the XBOX. The game content, the "FIFA 13 Demo" on the media platform may be identified such that the recommended-game content, "FIFA 13 Full Version" is downloaded in association with the "FIFA 13 Demo." In embodiments, this association may be made explicit to inform the user In this regard, the prefetched recommended-media content may be accessed faster than had it not been prefetched.

Figure 4:
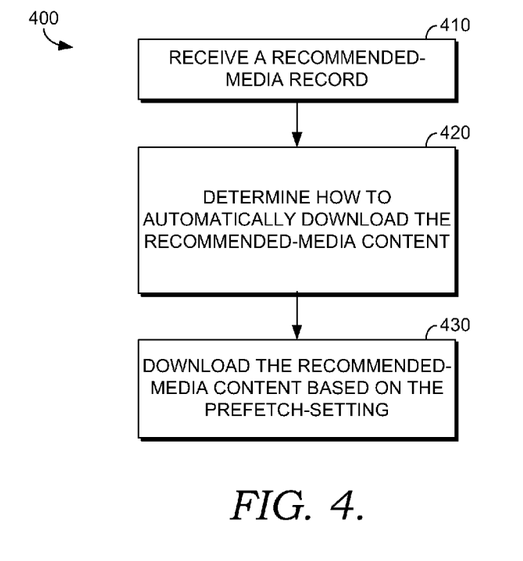
FIG. 4 is a flow diagram showing a method for prefetching recommended-media content based on a prefetch setting of a media platform in accordance with embodiments of the present invention.

Turning now to FIG. 4, a flow diagram is provided that illustrates a method 400 for prefetching recommended-media content. At block 410, a recommended-game record of recommended-game content is received. At block 420, how to automatically download the recommended-game content associated with the recommended-game record is determined, based on a prefetch setting. The recommended-game content is downloaded based on the prefetch setting, as shown at block 430.

Figure 5:
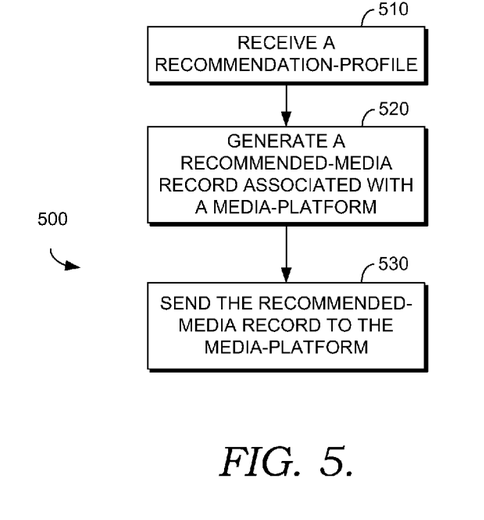
FIG. 5 is a flow diagram showing a method for prefetching recommended-media content based on a prefetch setting of a media platform in accordance with embodiments of the present invention.

Turning now to FIG. 5, a flow diagram is provided that illustrates a method 500 for prefetching recommended-media content. At block 510, a recommendation profile comprising recommendation metrics for identifying recommended-media content is received. At block 520, a recommended-media record of recommended-media content is generated based on the recommendation profile. The recommended-media content is downloaded to a media platform based on determining a prefetch setting of the media platform. Determining that the prefetch setting is a default setting results in automatically, without user intervention, downloading the recommended-media content to the media platform. In contrast, determining that the prefetch setting is a customized setting results in automatically without user intervention downloading the recommended-media content based on the customized prefetch setting. The recommended-media record is sent to the media platform, as shown at block 530.

Figure 6:
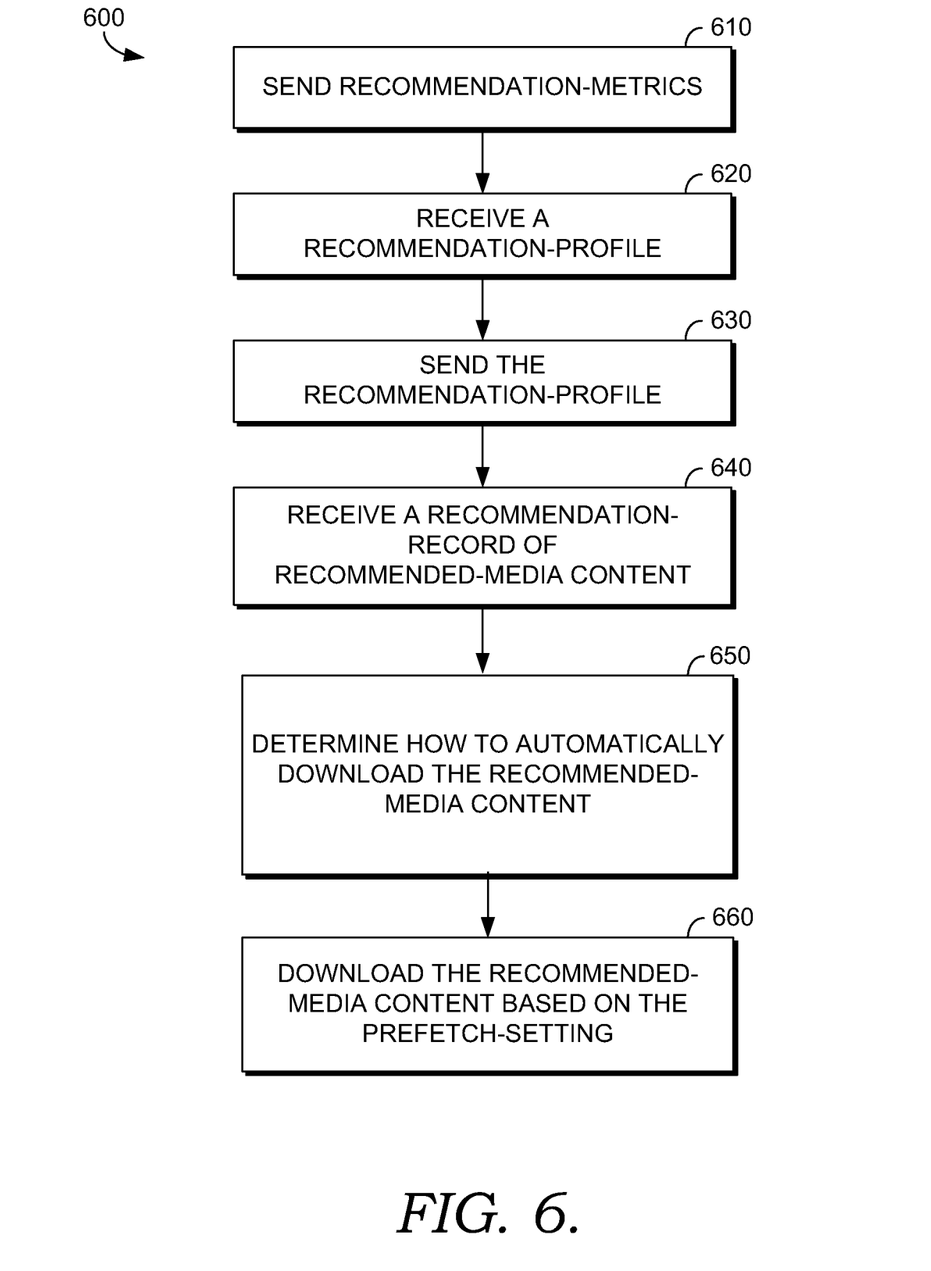
FIG. 6 is a flow diagram showing a method for prefetching recommended-media content based on a prefetch setting of a media platform in accordance with embodiments of the present invention.

Turning now to FIG. 6, a flow diagram is provided that illustrates a method 600 for prefetching recommended-media content. Initially, as shown at block 610, recommendation metrics are sent to a recommendation-metrics server. As shown at block 620, a recommendation profile is generated based on the recommendation metrics. The recommendation profile is associated with a media platform. At block 630, the recommendation profile is sent to the recommendation engine. A recommended-media record of recommended-media content is received, as shown at block 640. The recommended-media record is generated based on the recommendation profile and the recommended-media record is associated with the media platform. At block 650, how to automatically, without user intervention, download the recommended-media content associated with the recommended-media record is determined, based on a prefetch setting. A default prefetch setting results in automatically downloading the recommended-media content to the media platform and a customized prefetch setting results in downloading the recommended-media content based on the customized prefetch setting. In embodiments, automatically may mean without human intervention. The recommended-media content is downloaded without user intervention based on the prefetch setting, as shown at block 660.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when used by one or more computing devices, cause the one or more computing devices to perform a method for prefetching recommended-game content based on a prefetch setting of a media platform, the method comprising:
receiving a recommendation profile comprising recommendation metrics for identifying recommended-game content, wherein the recommendation profile is associated with the media platform;
sending the recommendation profile to a recommendation engine, wherein the recommendation profile is used to identify the recommended-game content;
receiving a recommended-game record reciting the recommended-game content, wherein the recommended-game record is associated with the media platform;
determining, based on the prefetch setting for the media platform, how to automatically download the recommended-game content to the media platform, wherein the prefetch setting comprises parameters for downloading the recommended-game content, the parameters associated with at least one of scheduling, bandwidth, and capacity parameters of the media platform; and
downloading the recommended-game content based on the prefetch setting.

2. The media of claim 1, further comprising sending recommendation metrics to a recommendation-metrics server, wherein recommendation metrics include at least usage of game content associated with the media platform;
receiving the recommendation profile generated based on the recommendation metrics, wherein the recommendation profile is associated with the media platform; and
sending the recommendation profile to the recommendation engine.

3. The media of claim 2, wherein sending the recommendation metrics to the recommendation-metrics server is based on an occurrence of a game content consumption event.

4. The media of claim 2, further comprising:
upon receiving the recommendation profile generated based on the recommendation metrics, updating the recommendation profile with real-time signals at the media platform, wherein the recommendation profile as received is associated with processed signals.

5. The media of claim 1, further comprising:
upon an occurrence of a game content consumption event for the recommended-game content, sending recommendation metrics for the recommended-game content; and
receiving an updated recommended-profile such that a subsequent recommended-game content is based on an updated recommendation profile, wherein the updated recommended-profile includes updates based on recommendation metrics for the recommended-game content.

6. The media of claim 5, wherein the game content consumption event includes at least an interaction with the recommended-game content that provides recommendation-metrics for the recommended-game content.

7. The media of claim 1, further comprising identifying game content on the media platform such that the recommended-game content is downloaded in association with a game content.

8. The media of claim 7, wherein the media platform is a video game console, the recommended-game content is a full version game, and the game content is a demo game.

9. The media of claim 1, wherein the prefetch setting is a default setting or a customized setting.

10. One or more computer storage media storing computer-useable instructions that, when used by one or more computing devices, cause the one or more computing devices to perform a method for prefetching recommended-media content based on a prefetch setting, the method comprising:
receiving a recommendation profile comprising recommendation metrics for identifying recommended-media content;
generating a recommended-media record reciting recommended-media content that is generated based on the recommendation profile, wherein the recommended-media content is downloaded to a media platform based on determining the prefetch setting of the media platform, wherein the prefetch setting comprises parameters for downloading the recommended-media content, the parameters associated with at least one of scheduling, bandwidth, and capacity parameters of the media platform.
and wherein determining that the prefetch setting is a default setting results in automatically downloading the recommended-media content to the media platform and determining that the prefetch setting is a customized setting results in automatically downloading the recommended-media content based on the customized prefetch setting; and
sending the recommended-media record to the media platform.

11. The media of claim 10, wherein the recommendation profile further comprises associations with additional recommendation profiles, wherein the additional recommendation profiles are used to generate the recommended-media content.

12. The media of claim 11, wherein the additional recommendation profiles are associated with the recommendation profile based on a social network.

13. The media of claim 10, wherein determining recommended-media content based on the recommendation profile further comprises analyzing social networking content associated with a user associated with the recommendation profile.

14. The media of claim 10, wherein the recommendation profile further comprises previously recommended-media content such that determining recommended-media content is based at least in part on the previously recommended-media content.

15. The media of claim 10, wherein the recommendation profile further comprises purchase history associated with the media platform or a user associated with the recommendation profile.

16. The media of claim 10, further comprising:
  receiving updated recommended-metrics associated with the recommended-media content downloaded to the media platform; and
  updating the recommendation profile based on updated recommended-metrics such that a subsequent recommended-media content is based on an updated recommendation profile.

17. A method for prefetching a recommended-media content based on prefetch settings, the method comprising:
  sending recommendation metrics to a recommendation-metrics server;
  receiving a recommendation profile generated based on recommendation metrics, wherein the recommendation profile is associated with a media platform;
  sending the recommendation profile to a recommendation engine;
  receiving a recommended-media record reciting the recommended-media content, generated based on the recommendation profile, wherein the recommended-media record is associated with the media platform;
  determining, based on the prefetch setting for the media platform, how to automatically download the recommended-media content to the media platform, wherein the prefetch setting comprises parameters for downloading the recommended-media content, the parameters associated with at least one of scheduling, bandwidth, and capacity parameters of the media platform, wherein a default prefetch setting results in, without user intervention, automatically downloading the recommended-media content to the media platform and a customized prefetch setting results in without user intervention, automatically downloading the recommended-media content based on the customized prefetch setting; and
  downloading the recommended-media content based on the prefetch setting.

18. The method of claim 17, further comprising upon receiving the recommendation profile generated based on the recommendation metrics, updating the recommendation profile with real-time signals at the media platform, wherein the recommendation profile as received is associated with processed signals.

19. The method of claim 17, wherein the media platform is associated with an interface that controls the downloading of the recommended-media content, and wherein controlling the downloading includes actions selected from the following:
  pausing the download of the recommended-media content;
  resuming the download of the recommended-media content; and
  deleting the download of the recommended-media content.

20. The method of claim 17, further comprising:
  sending the recommendation metrics for the recommended-media content; and
  receiving an updated recommended-profile such that a subsequent recommended-media content is based on an updated recommendation profile, wherein the updated recommended-profile includes updates based on the recommendation metrics for the recommended-media content.

* * * * *